United States Patent Office 3,245,222
Patented Apr. 12, 1966

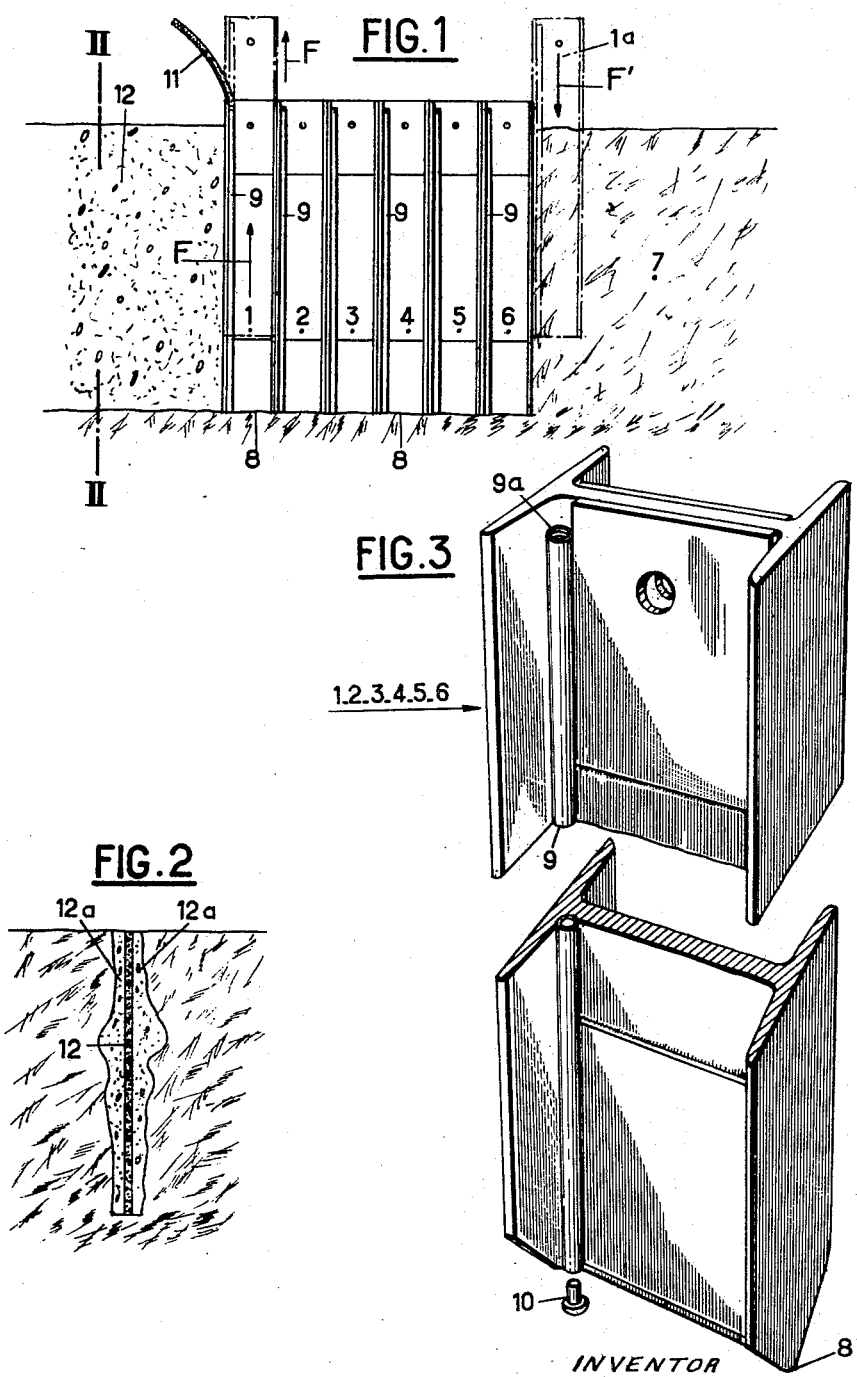

3,245,222
CONSTRUCTION OF UNDERGROUND DAMS
Marius Galaup, deceased, late of Blagnac, France, by Noelie Galaup, executrix, Blagnac, France, assignor to Societe d'Etudes et Travaux de Fondations, Blagnac, France, a French corporation
Filed Oct. 24, 1962, Ser. No. 232,906
2 Claims. (Cl. 61—35)

In order to keep water out of underground spaces, it is a general practice to construct a deep dam extending down through porous ground to a non-porous layer and preventing the underground water from entering a certain zone, for instance a zone surrounding an excavation which is about to be made.

A dam of this kind can be made by various methods. One of these methods consists in hammering in a screen of metal dam beams. This solution is often perfectly satisfactory, but nevertheless has a disadvantage. In solid ground, a screen of dam beams does not stop the circulation of the phreatic water, because the speeds of circulation are very slow and cause the joints to be blocked up only very slowly. Also, the cost becomes prohibitive when it becomes necessary to use heavy sections because of the depth or compactness of the soil.

It is also possible to inject a grouting into the actual material of the ground in order to fill and block up the natural gaps in the ground. Appropriate material is injected into holes; the arrangement of these holes and the nature of the grouting depend on the required degree of impermeability and the size of the system of gaps to be filled.

This method of injection offers certain advantages, particularly in regard to versatility in use, but does not produce absolute impermeability. Also, the cost is high when a high degree of impermeability is required.

Lastly, it is possible to make a cavity in the sub-soil and fill this cavity with water-tight material; the cavity is made either by pulling out solid bodies that have been previously driven in, or by using mechanical excavators.

In each case, the excavation that has been made is filled in afterwards, either by pouring the filling material in directly from above, or by temporarily holding up the sides with a clay paste and afterwards replacing this paste by the material constituting the final screen or dam.

In the former case, this method has the disadvantage of leaving the excavation temporarily unsupported, so that the sides may collapse in places, whereby the material that is intended to form the screen is prevented from spreading uniformly over the whole height of the screen. Gaps are thus formed in the screen. This method can therefore by used only for constructing very shallow screens in solid ground and in the absence of water.

In the latter case, the method is costly and calls for an additional operation.

The present invention relates to a method by which the above-mentioned disadvantages can be obviated. It also relates to means for carrying this method into effect.

The method according to the present invention consists essentially in progressively forming an empty space in the ground that is to be made water-tight and at the same time progressively filling this space from the bottom to the top, by continuous injection, with material adapted to form a dam or screen, under sufficient pressure to ensure that the ground cannot collapse on either side of the screen and is itself made water-tight, the density and viscosity of this material being such as to prevent any water from passing through the screen.

In one form of this method, the empty space is produced by removal of juxtaposed elements previously introduced into the ground, which elements are successively extracted by mechanical means and are each provided with a respective tube which terminates at or near the bottom end of the element and through which the material for forming the screen is injected while the element is being extracted. Water-tightness is thus produced by filling the thin gap and by injection into an adjacent layer of ground of appropriate width.

To enable the method set forth above to be more clearly understood, one form of this method, chosen purely by way of example, is described hereunder with reference to the accompanying drawings, in which:

FIGURE 1 illustrates the use of this method in a case in which the space, required for making the water-tight screen, is produced by driving in and removing dam beams;

FIGURE 2 is a section on line II—II of FIGURE 1, and

FIGURE 3 is a detailed view in perspective, on a larger scale than FIGURE 1, showing the form and structure of the dam beams.

With references to FIGURES 1 and 2, 1, 2, 3, 4, 5 and 6 are elements introduced into the ground 7, by hammering or in any other suitable way, in the plane of the screen 12 that is being constructed. These elements consist for instance of dam beams placed side by side to form a caisson, and each element has at its bottom end a cutting edge 8 (FIGURE 3) which can be used more particularly in the case or filled-in ground that is not compact.

It is to be observed that in the case of alluvial deposits these elements may consist of thin section members. A respective injection tube 9 is attached, for instance welded, to each element. Each tube is provided at the top end with means, for instance a screw-thread, for attaching a pipe end, and a respective plug 10 (FIGURE 2) fits into the bottom end of each tube and permits the tube to be introduced into the ground without any risk of being blocked. This plug is driven out and forced into the ground when the screen material is expelled through the tube.

When all the elements have been sunk in the ground (FIGURE 1), an injection pipe 11 is connected to the tube 9 of the element 1 and this element 1 is progressively extracted (as indicated by the broken lines and arrow F in FIGURE 1) while the material is being progressively injected through the pipe 11.

The pressure of the material ensures that the empty spaces formed by the withdrawal of the element 1 will be filled as fast as they are formed, and at the same time causes the empty spaces near the screen to be filled so that the ground at 12a (FIGURE 2) is made watertight.

This pressure, and the procedure set forth above, ensure that the screen 12 will be continuous.

When the element 1 has been completely extracted, this element is placed at 1a, against the element 6, and is again sunk in the ground as indicated by the arrow F'. The element 2 is then withdrawn; the pipe 11 is attached to the tube 9 of the element 2, and the operation proceeds as described above with reference to the element 1.

The same procedure is repeated with respect to the elements 3, 4, 5 and 6.

FIGURE 2 diagrammatically illustrates the finished screen and the consolidated ground on each side of this screen.

The material used for forming the screen may be reinforced or non-reinforced concrete. It may alternatively be a ternary grouting material containing clay, cement and sand and ensuring good mechanical strength and sufficient flexibility to remain undamaged by deformation.

Lastly, more particularly in the case of alluvial deposits the material may be a binary grouting material containing clay and cement, or any other equivalent material.

The above-described way of carrying the invention into effect is only one example, and may be modified in any required way while remaining within the scope of the invention as defined by the following claims.

What is claimed is:

1. The method of constructing a fluid-tight subterranean wall which comprises the steps of cutting a trench in the ground by driving thereinto a row of elongated solid web members shaped to cut into said solid earth and aligned to form a continuous barrier, and successively withdrawing said web members one by one from the ground while simultaneously forcing into the space vacated thereby, as rapidly as said web members are withdrawn, a fluent material which sets to form a continuous wall, said fluent material being supplied directly beneath said web members under pressure sufficient to cause said material to impregnate the adjacent ground.

2. The method claimed in claim 1 according to which said fluent material is concrete.

References Cited by the Examiner

UNITED STATES PATENTS

| | | | |
|---|---|---|---|
| 910,252 | 1/1909 | Wolfley | 61—53.64 |
| 1,856,604 | 5/1932 | Upson | 61—53.64 |
| 2,663,064 | 12/1953 | Latham | 61—53.64 |
| 2,673,453 | 3/1954 | Templeton | 61—43.74 |

FOREIGN PATENTS

| | | |
|---|---|---|
| 520,004 | 2/1921 | France. |
| 856,684 | 3/1940 | France. |

CHARLES E. O'CONNELL, *Primary Examiner.*

EARL J. WITMER, *Examiner.*

J. SHAPIRO, *Assistant Examiner.*